Figure 1:
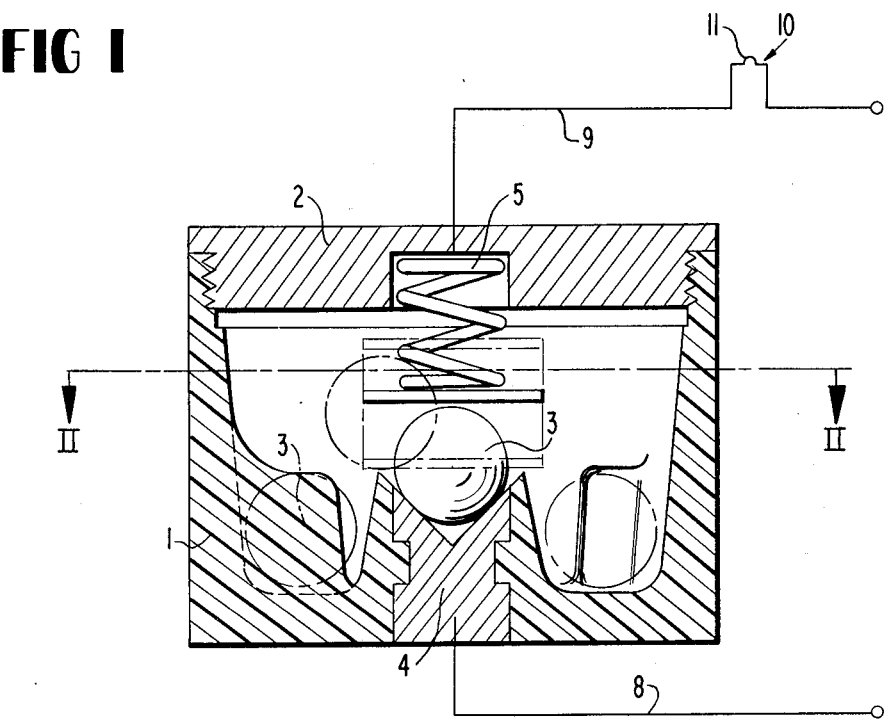

United States Patent [19]

Scholz et al.

[11] 4,060,004
[45] Nov. 29, 1977

[54] SENSOR ADAPTED TO BE TRIGGERED BY DECELERATION FORCES

[75] Inventors: Hansjürgen Scholz, Echterdingen; Hans-Gerd Backhaus, Holzgerlingen; Luigi Brambilla, Boblingen; Jürgen Gimbel, Gechingen, all of Germany

[73] Assignee: Daimler-Benz Aktiengesellschaft, Germany

[21] Appl. No.: 668,421

[22] Filed: Mar. 19, 1976

[30] Foreign Application Priority Data

Mar. 25, 1975 Germany .............................. 2513023

[51] Int. Cl.² .................. G01P 15/02; H01H 35/14
[52] U.S. Cl. ........................... 73/514; 116/114 AH; 200/61.45 R

[58] Field of Search .................. 116/114 AH; 73/514, 73/515, 517 R, 492; 200/61.45 R, 61.45 M; 340/52 H, 262

[56] References Cited

U.S. PATENT DOCUMENTS

| 2,912,534 | 11/1959 | Rowell et al. ............ 200/61.45 X |
| 3,630,168 | 12/1971 | Findlay ...................... 116/114 AH |

Primary Examiner—James J. Gill
Attorney, Agent, or Firm—Craig & Antonelli

[57] ABSTRACT

A sensor triggerable by deceleration forces, especially in motor vehicles, which accommodates within a housing a mass that is held with prestress; when deflected the mass is received by the bottom of the housing interior, whereby the interior space of the housing is subdivided into chambers by means of upwardly projecting partition walls which hold fast the deflected mass.

7 Claims, 2 Drawing Figures

SENSOR ADAPTED TO BE TRIGGERED BY DECELERATION FORCES

The present invention relates to a sensor adapted to be triggered by deceleration forces, especially in motor vehicles, which accommodates a mass retained in a housing with prestress, which when deflected is received by the bottom of the housing interior.

In a prior art construction of this type (German Offenlegungsschrift No. 2,241,528), a ball is provided as deflectable mass, for example, for preventing fires in case of collision which during the occurrence of shocks or impacts jumps in a desired direction out of a wedging means and interrupts an electrical connection. The ball thereby assumes an indeterminate position on the conical inner surface of the housing.

The present invention is therefore concerned with the task to so construct a sensor that the direction of the impact can be determined after an accident.

This takes place according to the present invention in that the interior space of the housing is subdivided into chambers by upwardly projecting partition walls which retain the deflected mass.

In one embodiment of the present invention, the partition walls, starting from the inner housing wall, extend radially shaped toward the non-deflected mass.

In order to utilize the deflectable mass simultaneously as switching element, an indicating device is provided in one of the lead-in or feed lines which undergoes a change when current flows therethrough.

In order to achieve this change, the indicating device may be constructed as primer capsule or pellet.

Accordingly, it is an object of the present invention to provide a sensor adapted to be triggered by deceleration forces which avoids by simple means the aforementioned shortcomings and drawbacks encountered in the prior art.

Another object of the present invention resides in a sensor adapted to be triggered by deceleration forces which permits a determination of the direction of the impact after an accident.

A further object of the present invention resides in a sensor of the type described above in which a deflection of the mass in the sensor is used simultaneously to actuate an indicating device.

Still a further object of the present invention resides in a sensor triggerable by deceleration forces, which permits a reliable analysis of the circumstances of the accident, yet is simple in construction and reliable in operation.

Figure 2:
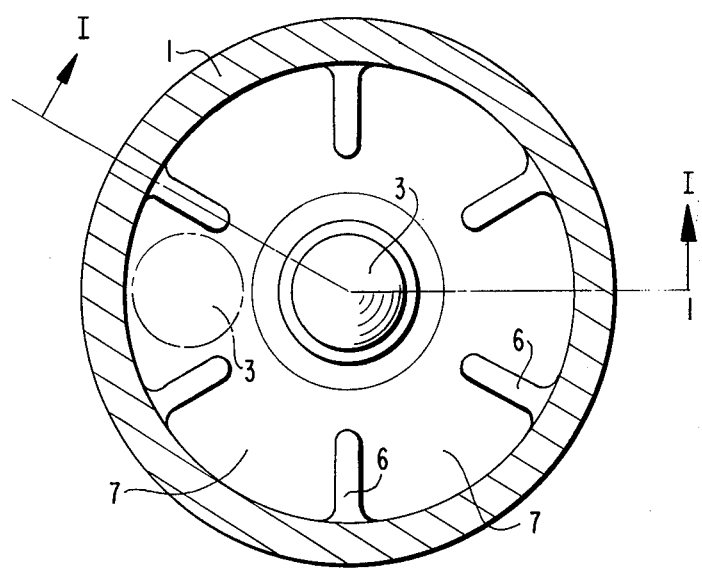

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through a housing of a sensor constructed in accordance with the present invention and taken along line I—I in FIG. 2; and FIG. 2 is a cross-sectional view taken along line II—II in FIG. 1.

Referring now to the drawing wherein like reference numerals are used throughout the two views to designate like parts, according to FIGS. 1 and 2, the sensor equipped in accordance with the present invention consists of a cylindrically shaped housing 1 with a cover 2 adapted to be screwed into the housing 1. In order to receive the deflectable mass, in the instant case a ball 3, a contact element 4 having an internal cone is provided in the housing 1. The ball 3 is kept under prestress by a spring element 5 having an upper contact in a recess of the cover 2. Partition walls 6 (FIG. 2) for example, six partition walls are provided in the instant case on the inside of the housing 1 which subdivide the housing 1 in the lower part thereof altogether into six chambers 7 (FIG. 2).

If a predetermined deceleration occurs as a result of an impact of the vehicle, then the ball 3 is deflected as a result of deceleration and is thrust into one of the chambers 7 depending on the direction or angle of the impact and is retained thereat. It is possible thereby to determine subsequently the direction and the angle of the impact and to reconstruct far-reachingly what happened at the time of the accident.

If a deceleration leading to a release or triggering has taken place, then the deflected ball 3 acts as switch element because the lower plate of the unstressed spring element 5 remains without connection to the contact element 4 and therewith the current flow to an indicating device generally designated by reference numeral 10 which represents a primer capsule or pellet 11 is interrupted. It is achieved thereby that the primer capsule or pellet 11 can no longer be ignited by a subsequent sensor pulse, for example, from a passenger safety device, such as an air bag or belt-tightener. In contradistinction thereto, in case of an erroneous triggering or release of the safety device without preceding impact, the ball 3 is not deflected. This means that the current flow by way of the parts 8, 4, 3, 5 and 9 is not interrupted so that the sensor pulse of the erroneously triggered safety device ignites the primer capsule or pellet 11. In the illustrated embodiment, the housing 1 and the cover 2 are made of an electrically non-conductive material.

The electrical logic can, of course, also be constructed in the reverse manner.

By means of the above-described construction according to the present invention of a sensor triggerable or releasable by deceleration forces in conjunction with an ignition pellet as indicating device, not only the impact angle but also the sequence of events can be subsequently determined unequivocally in a rapid and simple manner, i.e., whether the triggering or release of the device is to be traced back to a deceleration or to an error.

Finally, it is also possible within the scope of the present invention to so construct the partition walls in the interior space of the housing, for example, by extending the same upwardly that also after an accident involving a rolling-over of the vehicle, the ball cannot leave any longer the respective chamber.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A sensor triggerable by deceleration forces which include a housing means having a bottom, a mass retained with prestress in said housing means and received, when deflected, by the bottom of the housing interior, wherein the interior space of the housing means is subdivided by generally upright partition wall means into chambers which hold fast the deflected mass; and wherein said deflectable mass serves as an electrical switching element connected via an electrical connecting line to an indicating means which undergoes a change in condition when current flows therethrough.

2. A sensor according to claim 1, characterized in that the partition wall means starting from the inner housing wall extend in a substantially straight line toward the non-deflected mass.

3. A sensor according to claim 2, characterized in that the partition wall means extend essentially radially in the direction toward the non-deflected mass.

4. A sensor according to claim 1, wherein said indicating means comprises an electrically actuated ignition pellet.

5. A sensor according to claim 1, wherein said electrical connecting line is further connected to an electrically operated safety device such that the condition of said indicating means indicates whether or not said safety device received an electrical actuation signal on said electrical connecting line prior to the deflection of said mass.

6. A sensor triggerable by deceleration forces which includes a housing means having a bottom, a mass retained with prestress in said housing means and received, when deflected, by the bottom of the housing interior, wherein the interior space of the housing means is subdivided by generally upright partition wall means into chambers which hold fast the deflected mass, and the partition wall means starting from the inner housing wall extend in a substantially straight line toward the non-deflected mass, and the partition wall means extend essentially radially in the direction toward the non-deflected mass; wherein said deflectable mass serves as an electrical switching element connected via an electrical connecting line to an indicating means which undergoes a change in condition when current flows therethrough.

7. A sensor according to claim 6, wherein said indicating means comprises an electrically actuated ignition pellet.

* * * * *